US008490651B2

(12) United States Patent
Cheng et al.

(10) Patent No.: US 8,490,651 B2
(45) Date of Patent: Jul. 23, 2013

(54) FLUID ADJUSTING DEVICE

(75) Inventors: Yeuan-Jong Cheng, Kaohsiung (TW);
Chih-Hsin Chang, Kaohsiung (TW);
Po-Yi Tseng, Kaohsiung (TW)

(73) Assignee: Metal Industries Research & Development Centre., Kaohsiung (TW)

( * ) Notice: Subject to any disclaimer, the term of this patent is extended or adjusted under 35 U.S.C. 154(b) by 27 days.

(21) Appl. No.: 13/332,817

(22) Filed: Dec. 21, 2011

(65) Prior Publication Data
US 2012/0181472 A1 Jul. 19, 2012

(30) Foreign Application Priority Data

Jan. 14, 2011 (TW) .............................. 100101337 A

(51) Int. Cl.
*F16K 47/08* (2006.01)
(52) U.S. Cl.
USPC ...................... 137/625.3; 137/625.33; 138/46

(58) Field of Classification Search
USPC ... 137/599.01, 625.28, 625.3, 625.33; 251/118, 251/120, 121, 227; 138/46
See application file for complete search history.

(56) References Cited

U.S. PATENT DOCUMENTS

| 3,821,968 | A  | * | 7/1974 | Barb ........................... 137/625.3 |
| 4,375,821 | A  | * | 3/1983 | Nanao ............................ 137/239 |
| 4,671,321 | A  | * | 6/1987 | Paetzel et al. .............. 137/625.3 |
| 6,505,646 | B1 | * | 1/2003 | Singleton ................... 137/625.3 |
| 7,152,628 | B2 | * | 12/2006 | Folk et al. ................ 137/625.33 |
| 8,033,300 | B2 | * | 10/2011 | McCarty ......................... 138/42 |

* cited by examiner

*Primary Examiner* — John Rivell
*Assistant Examiner* — Reinaldo Sanchez-Medina
(74) *Attorney, Agent, or Firm* — C. G. Mersereau; Nikolai & Mersereau, P.A.

(57) ABSTRACT

A fluid adjusting device is installed in a valve unit so as to control the volume or pressure of the fluid passing through the valve unit. The fluid adjusting device includes three parts retractably connected to each other and holes are defined through each of the three parts. By expanding or retracting the three parts, the holes can be exposed or hidden to adjust the volume or pressure of the fluid passing through the valve unit.

3 Claims, 7 Drawing Sheets

FLUID ADJUSTING DEVICE

BACKGROUND OF THE INVENTION

1. Field of the Invention

The present invention relates to a fluid adjusting device, and more particularly, to a fluid adjusting device comprising three retractable parts to adjust the fluid in a valve unit.

2. Description of the Prior Art

The valve unit is installed in the piping system for controlling the fluid in the piping system and the valve unit can change direction of the fluid, change the volume of the fluid and the speed of the fluid, split the fluid into different sub-streams, stop the fluid in the piping system and prevent the fluid from flowing backward. Generally, in order to deliver the fluid to a remote user end, the fluid has to be delivered by a significant pressure. The users that take the fluid from the user end have to reduce the pressure to a certain level so as to convenient use the fluid.

The fluid adjusting device is installed in the valve unit to regulate and adjust the fluid by making multiple holes in the fluid adjusting device so that when the fluid passes through the fluid adjusting device, the speed and pressure of the fluid are reduced when passing through the holes. The conventional fluid adjusting device is designed to keep the fluid in motion while the pressure and speed are slowed, this is, the conventional fluid adjusting device is not designed to stop the fluid.

However, the conventional fluid adjusting device cannot precisely control the volume and speed of the fluid, so that the holes in the conventional fluid adjusting device cannot meet the requirements for some users.

The present invention intends to provide a fluid adjusting device that provides more functions to improve the shortcomings of the conventional fluid adjusting device.

SUMMARY OF THE INVENTION

The present invention relates to a fluid adjusting device which is installed in a valve unit and the valve unit comprises an inlet end, an outlet end and a shaft which is located between the inlet and outlet ends. The shaft is connected to the fluid adjusting device and the fluid adjusting device comprises a first part which is a cylindrical and hollow tube. The first part has a first outer surface and a first inner surface, wherein multiple holes are defined between the first outer surface and the first inner surface. Two first protrusions protrude from the first outer surface and the top of the first part is mounted to the shaft.

A second part is a cylindrical and hollow tube and the outer diameter of the second part is larger than that of the first part. The second part has a second outer surface and a second inner surface. Multiple holes are defined between the second outer surface and the second inner surface. Two second protrusions protrude from the second outer surface. Two second grooves are defined in the second inner surface, and the two first protrusions are movably engaged with the second grooves.

A third part is a cylindrical and hollow tube, and the outer diameter of the third part is larger than that of the second part. The third part has a third outer surface and a third inner surface. Multiple holes are defined between the third outer surface and the third inner surface. Two third grooves are defined in the third inner surface. The two second protrusions are movably engaged with the third grooves.

The users operate the shaft to rotate the first, second and third parts respectively to expand the fluid adjusting device. The fluid enters form the inlet end of the valve unit and passes through the holes of the three parts and flows out from the outlet end. The fluid adjusting device performs as buffering device to regulate the pressure and speed of the fluid.

The second and third grooves of the fluid adjusting device are curved grooves so that the three parts can be rotated to be expanded or retracted.

The three parts of the fluid adjusting device can be retracted so as to be used in a narrow space in the valve unit and response to different requirements of the volume of the fluid.

The holes of the three parts of the fluid adjusting device are tested and found to be round holes to perform the best function.

The holes of the three parts of the fluid adjusting device are located corresponding to each other so as to prevent turbulences when the fluid passes through the holes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
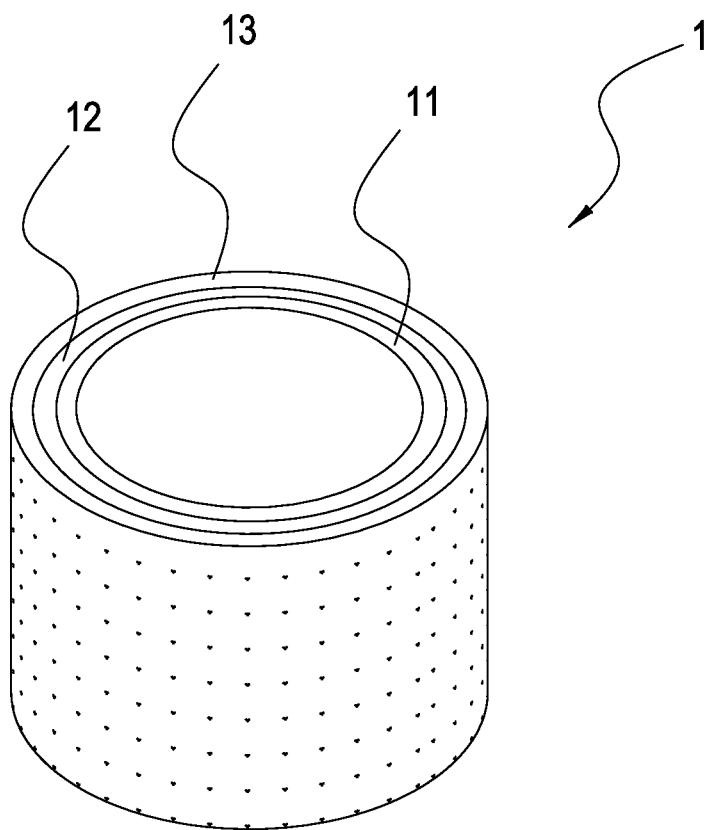
FIG. 1 is a perspective view to show the retracted adjusting fluid device of the present invention.

Referring to FIG. 1, the fluid adjusting device 1 of the present invention comprises a first part 11, a second tube 12 and a third tube 13, each of the first, second and third parts 11, 12, 13 is a cylindrical and hollow tube.

Figure 2:
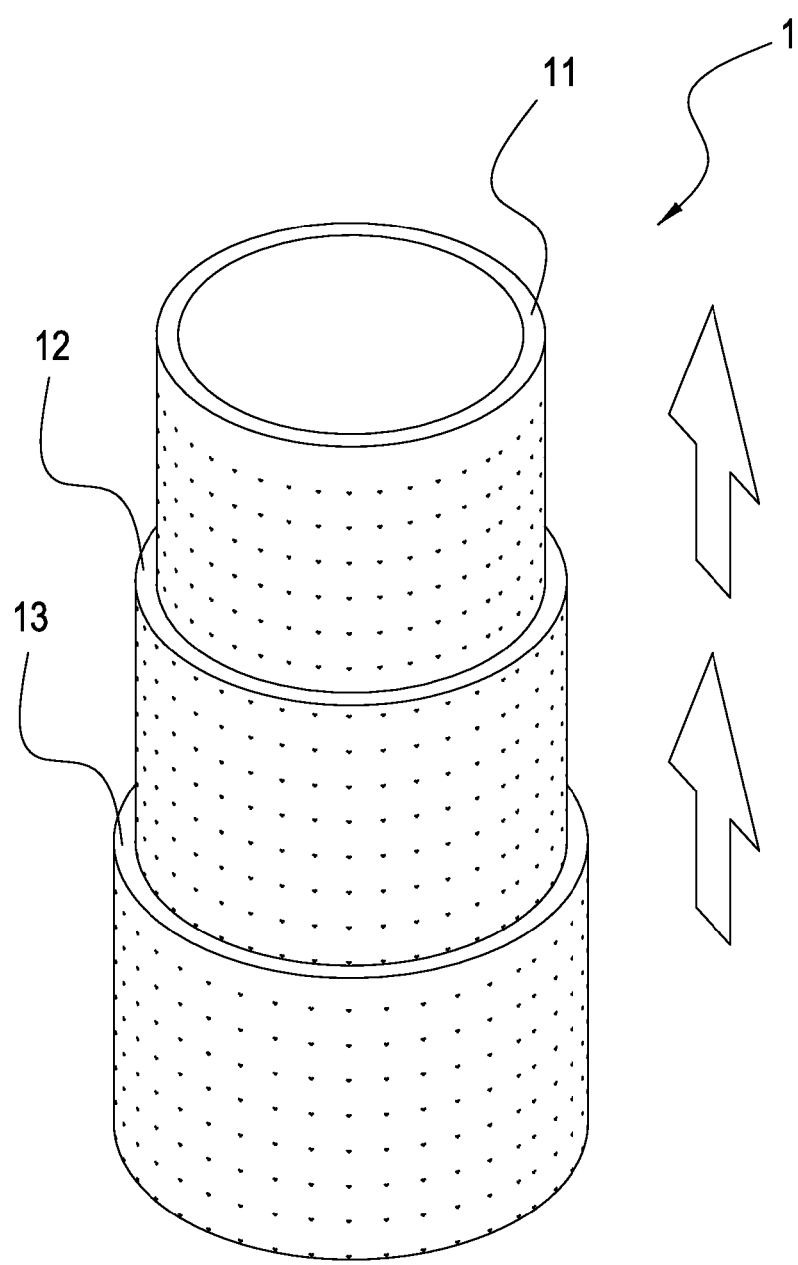
FIG. 2 is a perspective view to show the expanded adjusting fluid device of the present invention.
Figure 3:
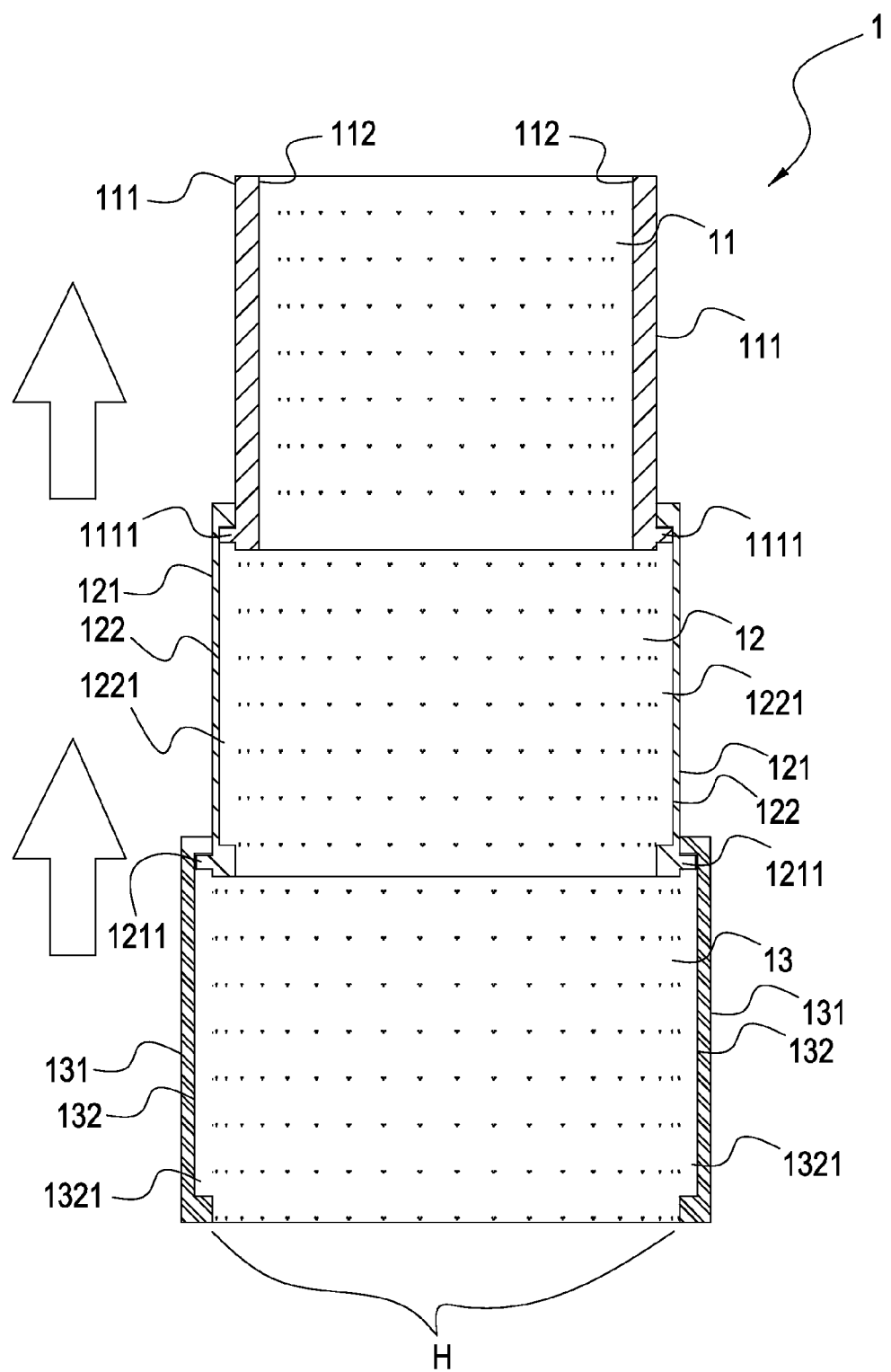
FIG. 3 is a cross sectional view to show the expanded adjusting fluid device of the present invention.
Figure 4:
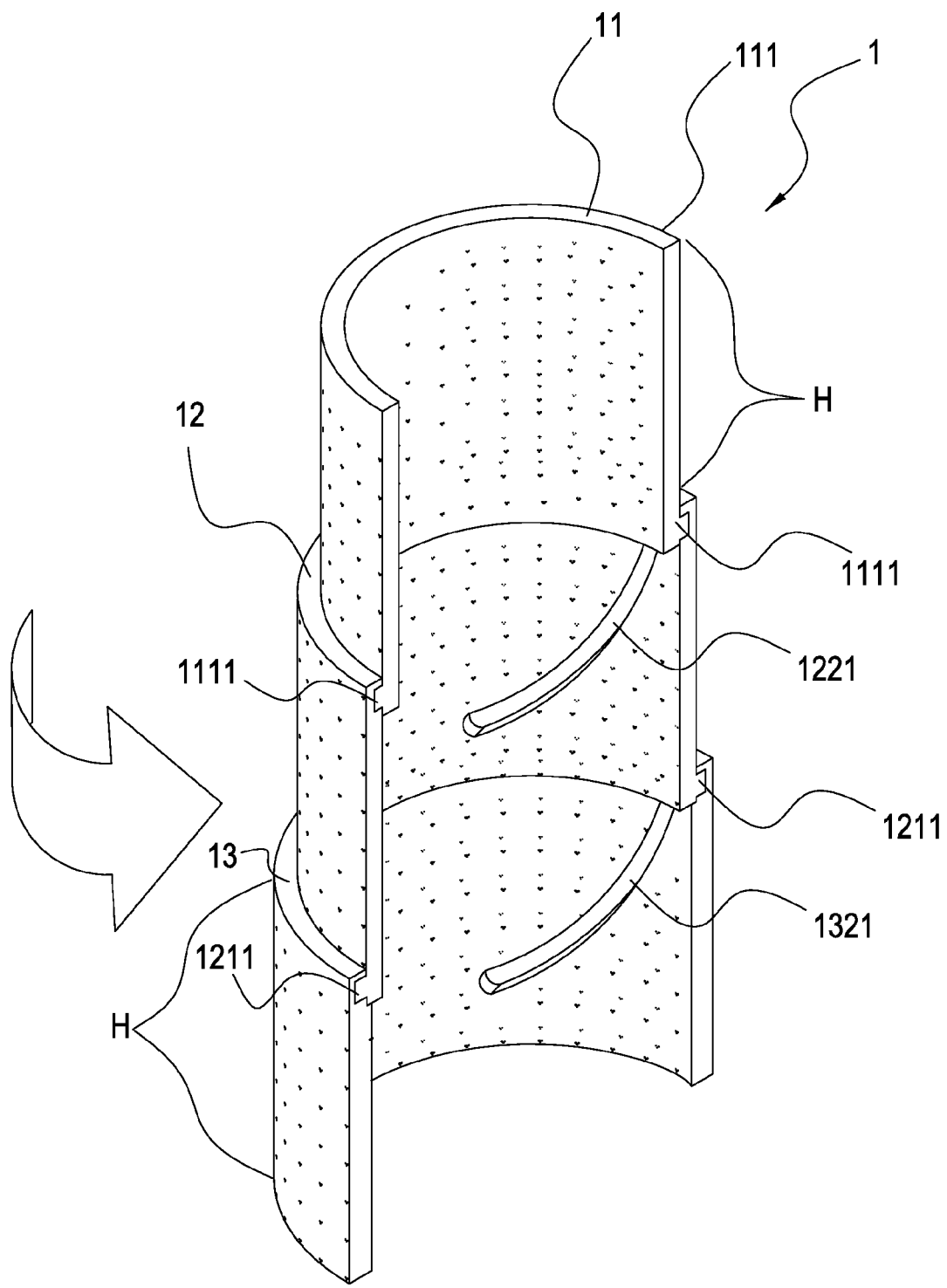
FIG. 4 is another cross sectional view to show the expanded adjusting fluid device of the present invention.

Referring to FIGS. 2 to 4, the first part 11 has a first outer surface 111 and a first inner surface 112. Multiple holes "H" are defined between the first outer surface 111 and the first inner surface 112. Two first protrusions 1111 protrude from the first outer surface 111.

The second part 12 has a second outer surface 121 and a second inner surface 122. Multiple holes "H" are defined between the second outer surface 121 and the second inner surface 122. Two second protrusions 1211 protrude from the second outer surface 121. Two second grooves 1221 are defined in the second inner surface 122. The outer diameter of the second part 12 is larger than that of the first part 11 so that the first part is retractable in the second part 12, and the second part 12 the two first protrusions 1111 are movably engaged with the second grooves 1221.

The third part 13 has a third outer surface 131 and a third inner surface 132. Multiple holes "H" are defined between the third outer surface 131 and the third inner surface 132. Two third grooves 1321 are defined in the third inner surface 132.

The two second protrusions 1211 are movably engaged with the third grooves 1321. The outer diameter of the third part 13 is larger than that of the second part 12 so that so that the second part 12 is retractable in the third part 13.

Figure 5:
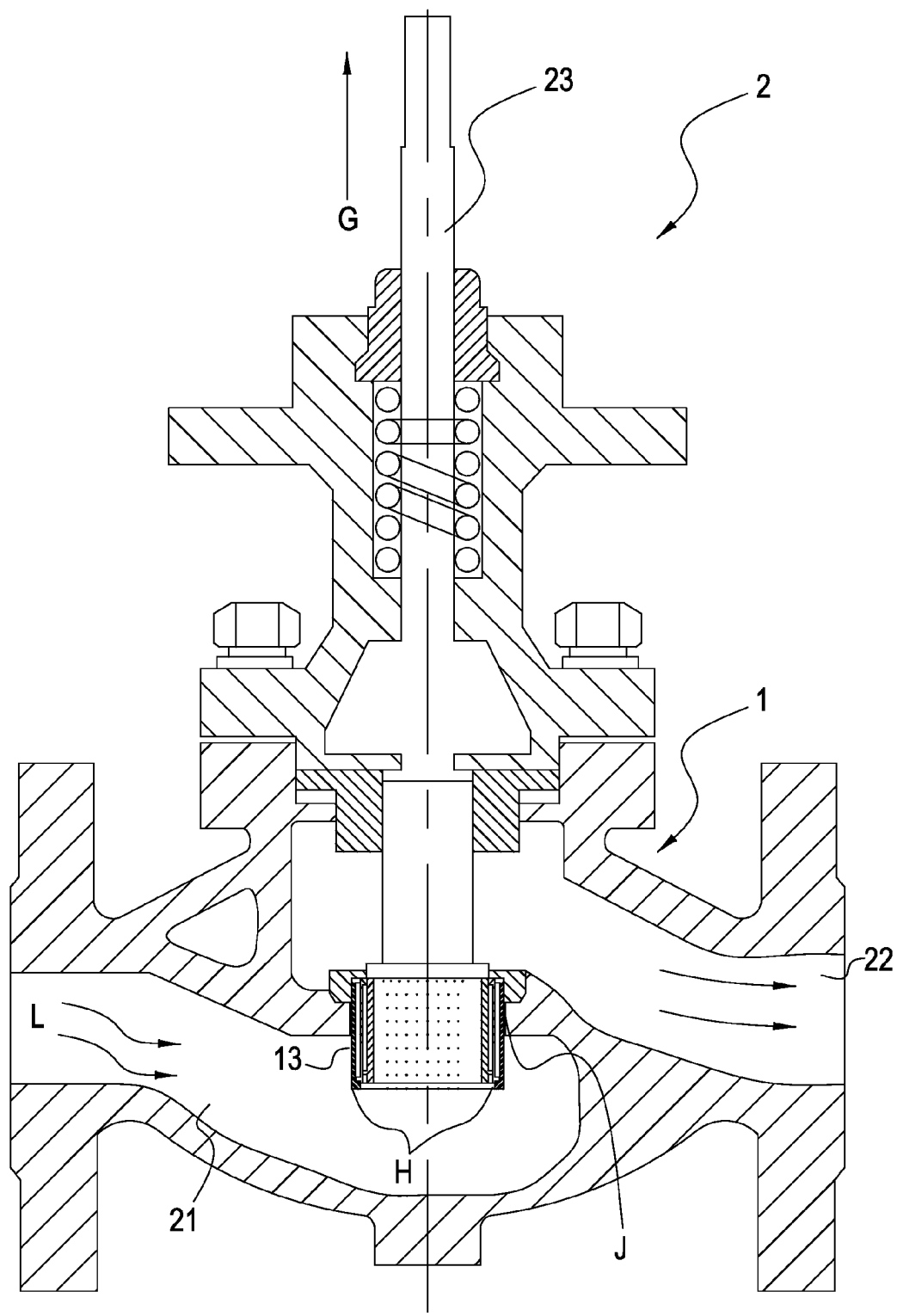
FIG. 5 is a cross sectional view to show that the adjusting fluid device of the present invention is installed in a valve unit and in a retracted status.

Referring to FIG. 5, the fluid adjusting device 1 is installed in a valve unit 2 so as to control the volume or pressure of the fluid passing through the valve unit 2. The valve unit 2 has an inlet end 21, an outlet end 22 and a shaft 23 which is located between the inlet and outlet ends 21, 22. The top of the first part 11 is mounted to the shaft 23. A conjunction path "J" is defined between the inlet end 21 and the outlet end 22, the conjunction path "J" is engaged with the third part 13. Generally, the fluid adjusting device 1 is not designed to stop the fluid "L", the fluid adjusting device 1 is designed to adjust the pressure or volume of the fluid "L" which is moving through the valve unit 2. Therefore, the fluid "L" passes through the holes "H" of the three pats 11, 12, 13 and flows out from the outlet end 22.

Figure 6:
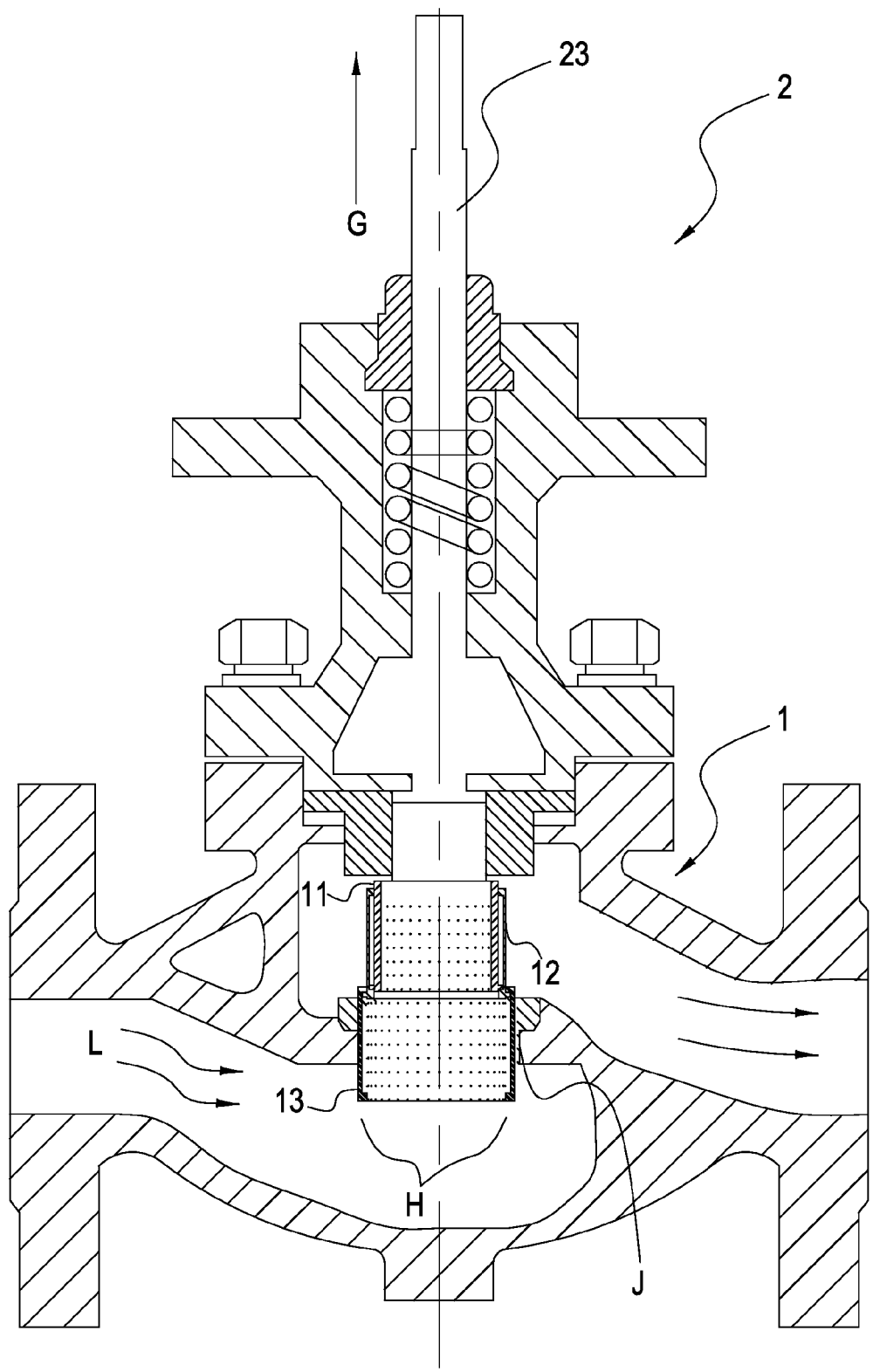
FIG. 6 is a cross sectional view to show that the adjusting fluid device of the present invention is installed in a valve unit and in a partially retracted status.

In FIG. 5, the fluid adjusting device 1 is in the retracted status and the fluid "L" passes through the holes "H" at a certain flow rate. When the volume of the fluid "L" needs to be increased, the user pulls the shaft 23 in the direction as shown by the arrow head "G", as shown in FIG. 6, the first part 11 is pulled upward by the shaft 23 and the second part 12 is lifted by the first part 11 by the engagement between the first protrusions 1111 and the second grooves 1221. However, the third part 13 is stationary by the conjunction path "J". The second protrusions 1211 are moved along the third grooves 1321 until the second protrusions 1211 are stopped by the ends of the third grooves 1321. The first part 11 is retracted in the second part 12. Both of the first and second parts 11, 12 are disengaged from the third part 13. The more number of the holes "H" are exposed so that the volume of the fluid "L" is increased.

Figure 7:
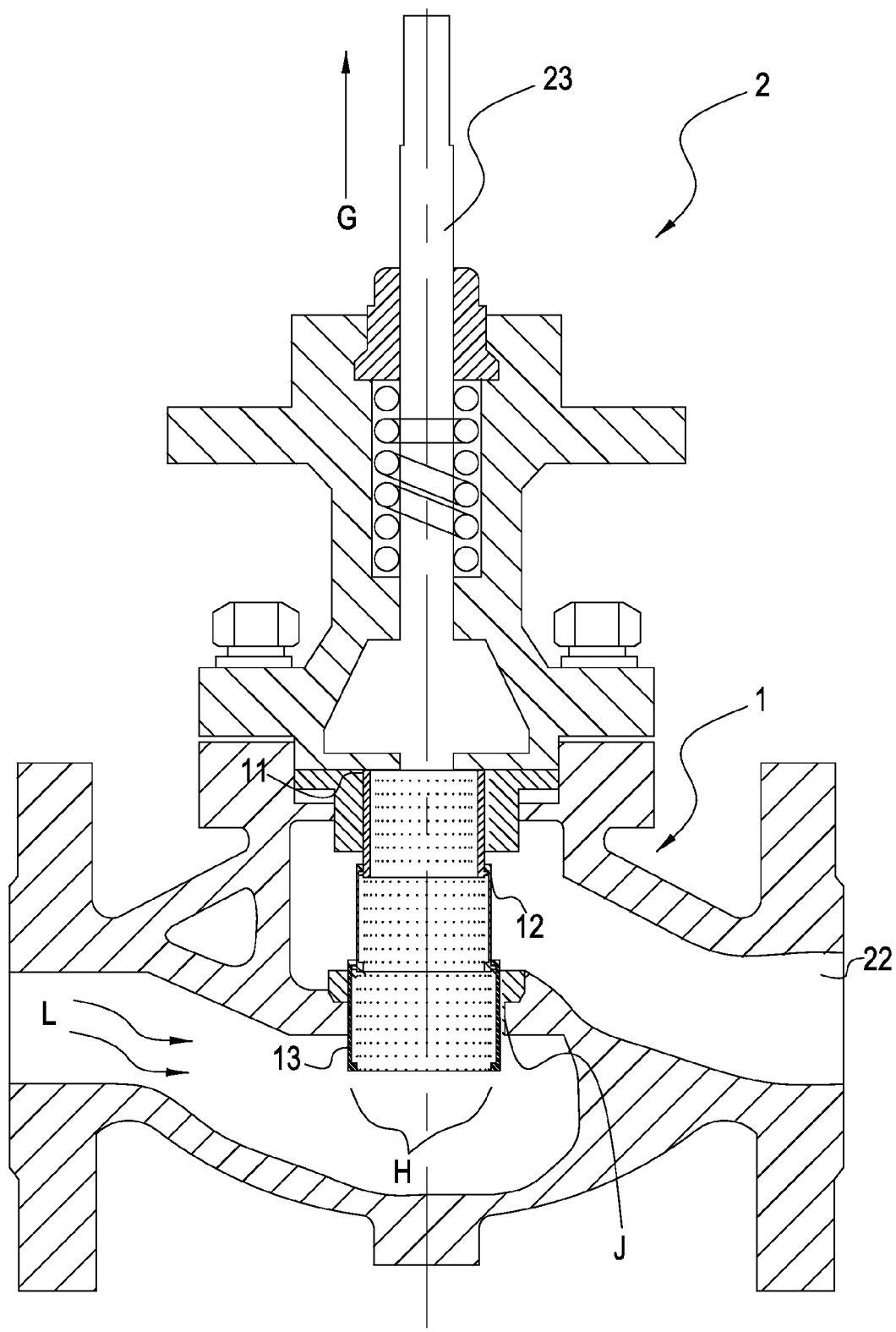
FIG. 7 is a cross sectional view to show that the adjusting fluid device of the present invention is installed in a valve unit and in an expanded status.

If the volume of the fluid "L" needs to be further increased, the shaft 23 is then further pulled in the direction of "G", as shown in FIG. 7, the first protrusions 1111 are moved along the second grooves 1221 to pull the first part 11 from the second part 12. Therefore, even more holes "H" are exposed and the volume of the fluid "L" can be further increased.

The holes "H" of the three parts 11, 12, 13 of the fluid adjusting device 1 are located corresponding to each other so that when the fluid "L" passes through the holes "H" of the third part 13, the fluid "L" does not generate turbulences by the second outer surface 121 of the second part 12.

Preferably, the second and third grooves 1221, 1321 are not straight grooves, as shown in the drawings, the second and third grooves 1221, 1321 are curved grooves. The protrusions 1111, 1211 have more time to move along the grooves 1221, 1321 so as to be stopped by the respective ends of the grooves 1221, 1321.

The holes "H" of the three parts 11, 12, 13 of the fluid adjusting device 1 are tested and found to be round holes to perform the best function.

While we have shown and described the embodiment in accordance with the present invention, it should be clear to those skilled in the art that further embodiments may be made without departing from the scope of the present invention.

What is claimed is:

1. A fluid adjusting device installed in a valve unit which comprises an inlet end, an outlet end and a shaft which is located between the inlet and outlet ends the shaft connected to the fluid adjusting device, the fluid adjusting device comprising:
   a first part being a cylindrical and hollow tube, the first part having a first outer surface and a first inner surface, multiple holes defined between the first outer surface and the first inner surface, two first protrusions protruding from the first outer surface, a top of the first part adapted to be mounted to the shaft;
   a second part being a cylindrical and hollow tube, an outer diameter of the second part being larger than that of the first part, the second part having a second outer surface and a second inner surface, multiple holes defined between the second outer surface and the second inner surface, two second protrusions protruding from the second outer surface, two second grooves defined in the second inner surface, the two first protrusions movably engaged with the second grooves, and
   a third part being a cylindrical and hollow tube, an outer diameter of the third part being larger than that of the second part, the third part having a third outer surface and a third inner surface, multiple holes defined between the third outer surface and the third inner surface, two third grooves defined in the third inner surface, the two second protrusions movably engaged with the third grooves.

2. The device as claimed in claim 1, wherein the second and third grooves are curved grooves.

3. The device as claimed in claim 2, wherein the holes are round holes.

* * * * *